United States Patent
Ogasawara

(10) Patent No.: US 6,386,450 B1
(45) Date of Patent: May 14, 2002

(54) ELECTRONIC SHOPPING SYSTEM INCLUDING CUSTOMER RELOCATION RECOGNITION

(75) Inventor: Nobuo Ogasawara, San Diego, CA (US)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/629,992

(22) Filed: Aug. 1, 2000

Related U.S. Application Data

(63) Continuation of application No. 09/070,373, filed on Apr. 30, 1998, now Pat. No. 6,123,259.

(51) Int. Cl.⁷ .............................................. G06K 15/00
(52) U.S. Cl. ................... 235/383; 235/380; 235/472.01
(58) Field of Search .................................. 235/383, 380, 235/381, 472.01; 705/14

(56) References Cited

U.S. PATENT DOCUMENTS

| | | | |
|---|---|---|---|
| 3,251,543 A | 5/1966 | Bush et al. | 235/380 |
| 4,750,151 A | 6/1988 | Baus | 364/900 |
| 4,835,372 A * | 5/1989 | Gombrich et al. | 235/375 |
| 4,929,819 A * | 5/1990 | Collins, Jr. | 235/383 |
| 5,250,789 A | 10/1993 | Johnsen | 235/383 |
| 5,294,781 A | 3/1994 | Takahashi et al. | 235/376 |
| 5,424,524 A | 6/1995 | Ruppert et al. | 235/462 |
| 5,572,653 A | 11/1996 | DeTemple et al. | 395/501 |
| 5,637,847 A | 6/1997 | Watanabe | 235/383 |
| 5,691,684 A | 11/1997 | Murrah | 235/385 |
| 5,729,697 A * | 3/1998 | Schkolnick et al. | 235/383 |
| 5,821,512 A * | 10/1998 | O'Hagan et al. | 235/383 |
| 5,887,271 A | 3/1999 | Powell | |
| 5,918,211 A * | 6/1999 | Sloane | 705/16 |
| 6,026,370 A * | 2/2000 | Jermyn | 705/14 |
| 6,026,377 A | 2/2000 | Burke | |
| 6,123,259 A * | 9/2000 | Ogasawara | 235/380 |

FOREIGN PATENT DOCUMENTS

| | | |
|---|---|---|
| GB | 2307575 | 5/1997 |
| WO | WO 97/29452 | 8/1997 |

* cited by examiner

Primary Examiner—Harold I. Pitts
(74) Attorney, Agent, or Firm—Christie, Parker & Hale, LLP

(57) ABSTRACT

An electronic personal shopping system, communicating between a store computer and a mobile terminal, for organizing a consumer's movement through a retail facility in accordance with the consumer's current location and the locations of desired items on either a shopping list or a recommended replenishment item list. The shopping list and recommended replenishment item list are hosted on a customer IC card and read by a mobile shopping terminal. A price look-up table is maintained in a store database and includes location indicia identified to each merchandise item of the store's inventory. As a product is scanned, that item's location indicia is assumed to represent a customer's current location. A desired destination item is taken from the shopping list or the recommended replenishment item list and a distance and direction metric is calculated based on the customer's current location. The system includes a processor capable of developing a recommended replenishment item list from a series of shopping history data records also hosted on the IC card. Each shopping trip results in preparation of a most recent shopping history data record.

20 Claims, 8 Drawing Sheets

| Replenishment Item Table 100 | Last Purchase Date 105 | Last Purchase Quantity & Unit 110 | Average Purchase Interval 115 | Average Purchase Quantity & Unit 120 | Number of Past Purchases 125 | Control Flag 130 |
|---|---|---|---|---|---|---|
| Item Description | | | | | | |
| | | | | | | |
| | | | | | | |
| | | | | | | |
| | | | | | | |
| | | | | | | |
| | | | | | | |
| | | | | | | |

Parameter
131 — Minimum Number of Past Purchases
132 — Maximum Purchase Interval

*FIG. 4*

PLU Table

| SKU | ITEM Information Brand Name / Generic Name | | Price | Location Information |
|---|---|---|---|---|
| 00001 | (Brand Name) | Apples | $1.99 | Location-a |
| 00002 | (Brand Name) | Tissues | $2.99 | Location-b |
| 00003 | (Brand Name) | Spice | $4.99 | Location-c |
| 00004 | (Brand Name) | Spice | $3.29 | Location-c |
| • | • | • | • | • |
| • | • | • | • | • |

*FIG. 6*

ELECTRONIC SHOPPING SYSTEM INCLUDING CUSTOMER RELOCATION RECOGNITION

CROSS REFERENCE TO RELATED APPLICATION

This application is a continuation of Ser. No. 09/070,373 filed Apr. 30, 1998, U.S. Pat. No. 6,123,259.

FIELD OF THE INVENTION

This invention relates generally to an electronic information display and customer location recognition, and, more particularly, to a computer based system for locating a customer's position within a shopping store and displaying product and location information on a customer operated mobile terminal.

BACKGROUND OF THE INVENTION

Retail stores today, especially supermarkets, compete fiercely to attract customers to their stores. One mode of attraction is via savings offered to customers in the two areas which are valued highly by most: time and money.

Most modern retail stores today use point of sale (POS) systems for providing customers with better, faster service. A POS system generally has one or more automated check-out terminals which is capable of sensing and interpreting the bar code printed on each item of merchandise to be checked out. Contained in the bar code is the item's Stock Keeping Unit (SKU) code. Each of the check-out terminals is connected to a computer which processes the SKU information. The computer's database includes a list of items of merchandise in the store, an SKU for each of these items, and various types of information, including pricing and inventory information, associated with each SKU. When a customer is ready to make a purchase, the store clerk simply uses an automated terminal to sense the bar code on each of the customer's selections. The computer interprets the SKU contained in the bar code, looks up the price for each item, and keeps a running total of the purchase.

Savings in money are offered to customers by the stores through lower prices on particular items of merchandise. To inform customers of such sales items, stores advertise through direct mail, radio, television, and/or newspapers, and often offer coupons for taking advantage of the promotional items. Furthermore, within the store itself, signs on shelves and on shopping carts, as well as bold pricing indicators on the products for sale, aim to catch a customer's attention and cause him or her to purchase the sales products.

The existing systems and programs designed to enable a customer to save time and money, however, leave a lot to be desired. For instance, although POS systems aid customers to speed the checkout process, they do not help reduce time during, or even before the shopping process begins. At home, customers often spend valuable time in preparing for the next shopping visit. For example, before going shopping, customers often investigate what items need to be replenished and what new items need be purchased. Many customers also spend time making shopping lists based on those investigations.

Once in the store, a customer continues to spend a considerable amount of time trying to locate the items that need to be purchased. Although in many supermarkets, signs throughout the store give customers a general indication as to the location of various categories of products, these signs fail to give customers precise location and direction information of specific products. Thus, many customers will roam the aisles in trying to locate the items he or she wants to purchase.

Customers, moreover, often fail to obtain the full benefit of the savings offered by a store. Despite the advertisements and signs within the store, it is not uncommon for a customer to walk by a sales item without realizing that it is on sale. Even if a customer does attempt to purchase an item advertised as being on sale, when the item is scanned during check-out, the price charged to the customer will sometimes not reflect the sales price and will go by unnoticed by the customer.

Therefore, there is a need for a shopping system which will aid customers to save time and money during shopping. Such system should give directions to the customer on items to purchase based on the customer's current location, and give suggestions on promotional items and items that the customer may need to replenish.

SUMMARY OF THE INVENTION

These and other objects are accomplished in accordance with the present invention by an electronic personal shopping system which is used in a retail facility to assist shoppers to efficiently organize their shopping trips in order to save time and money. The electronic personal shopping system is able to give directions to the shopper to various items in the store based on the shopper's current location and is also able to offer suggestions on promotional items and items that the customer may need to replenish.

In accordance with one aspect of the invention, the electronic personal shopping system includes a mobile terminal which may be either hand-held or mounted on a shopping cart at the desire of the customer. The mobile terminal is a microprocessor controlled unit and includes a portable scanner configured to read bar code information directly from items being considered for purchase. The mobile terminal is further configured to communicate with a store central computer by means of an individually addressable RF communication transceiver. Processed information is displayed to the customer on an LCD display panel. The mobile terminal further includes a reader/writer unit for interfacing with a smart-card like a customer ID card and a memory for storing data received either from the store central computer, the customer ID card, or both.

A merchandise item database, comprising at least a Price Look Up Table is organized into the store central computer's memory and is configured to include identification indicia for each item of merchandise, such as brand name, generic name, price and the like and also includes location information for each item of store merchandise. As a customer scans the bar code of a particular item, the store central computer accesses that item's location information and assigns that particular location to be the customer's current location. Either the store central computer or the mobile terminal is then able to calculate a direction and distance to a desired destination item based on the customer's current location and the location information assigned to the destination item in the merchandise item database.

In one particular aspect of the invention, the desired destination item is identified by processing the contents of a customer's shopping list and choosing the closest item to the customer's current location as the desired destination item. Direction and distance information, i.e., aisle and shelf number, is displayed on the mobile terminal's display panel. Each customer's shopping list is provided to the mobile terminal in various forms depending on the technology regularly available to a customer. A shopping list is recorded in a memory location on a customer's ID card and is read into the mobile terminal through the reader/writer unit. The mobile terminal may then transmit the shopping list to the store central computer using the RF communication transceiver. Alternatively, the shopping list is prepared on a customer's home personal computer system and is uploaded to the store's web site through an Internet connection. The shopping list is then downloaded from the web site to the mobile terminal. An optical scanner is able to read handwritten shopping lists that have been prepared in advance by a consumer. Handwritten shopping lists are converted into digital data by an OCR translation application and are either written to the customer's ID card or sent directly to the mobile terminal. However prepared and input, the customer's shopping list provides one basis for either the mobile terminal or the store central computer system to determine a desired destination item and prepare a suitable, high efficiency path through the store.

In a further aspect of the invention, desired destination items are suitably chosen from a recommended replenishment item list with the closest item to the customer's current location being chosen as the desired destination item. The recommended replenishment item list is generated according to the present invention by evaluating shopping history data records which are maintained on the customer ID card and analyzing items found in the data records with respect to a predetermined purchase interval period and the frequency of purchases of that particular item. Frequently purchased items for which a suitable period of time since the last purchase has elapsed are included as recommended items on a replenishment item list. In addition, a customer is able to affirmatively add certain items of merchandise to the recommended replenishment item list as well as delete certain items from the list which the customer no longer wishes to purchase. The recommended replenishment item list is written, by the mobile terminal, to a particular memory location on the customer's ID card, where it updates any previously written recommended replenishment item tables. The recommended replenishment item table may be transmitted to a store central computer system over the mobile terminal's RF communication link.

In a further aspect of the present invention, the customer ID card includes a customer personal profile memory section which lists certain demographic information with regard to the customer, such as age, sex, family status, i.e., children, and the like. Based on the customer's personal profile, either the mobile terminal or the store central computer develops recommended promotional items which a customer with that profile would likely purchase. A closest promotional item to the customer's calculated current location is then identified as the desired destination item and the mobile terminal displays those directions to the customer.

Thus, in accordance with the invention, customers are able to realize labor saving benefits during a shopping trip by moving through a store in a more efficient manner. Customers no longer need to search through the entire store to find a particular item of merchandise, but are instead directed to each next desired merchandise item along the shortest shopping path. Replenishment items, recommended promotional items and items contained on a general shopping list are all candidates for a next desired destination item based on the customer's current location. Current location is assumed to be the store location assigned to the last item of merchandise which a customer has scanned into an electronic personal shopping system's mobile terminal which communicates with a store central computer system over an RF link.

BRIEF DESCRIPTION OF THE DRAWINGS

These and other features, aspects and advantages of the present invention will be more fully understood when considered with respect to the following detailed description, appended claims and accompanying drawings wherein:

FIG. 4 is a conceptual layout diagram detailing the organization of a replenishment item table in accordance with practice of the present invention;

FIG. 6 is a conceptual layout diagram of an exemplary PLU table according to one embodiment of the present invention;

DETAILED DESCRIPTION OF THE INVENTION

Figure 1:
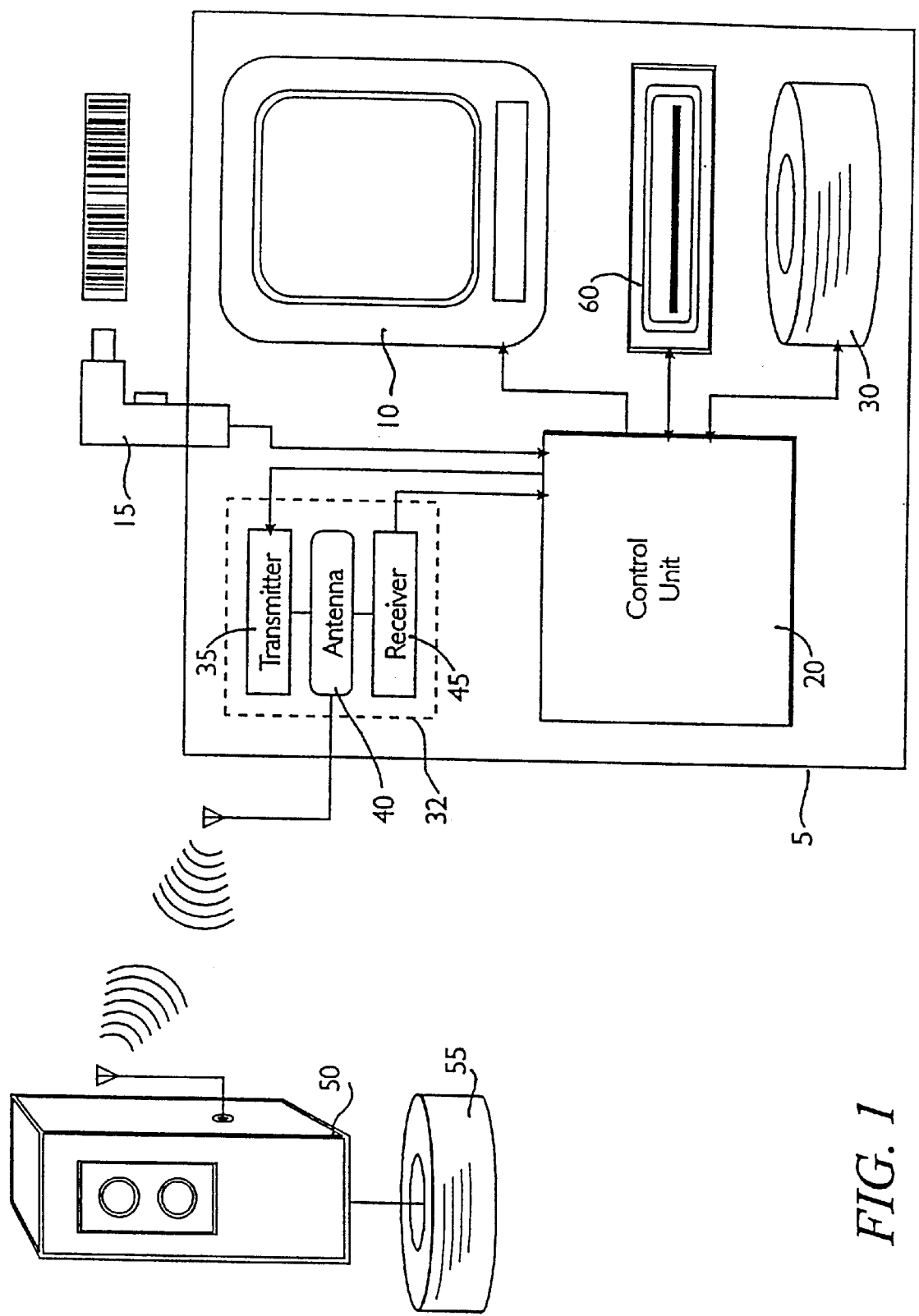
FIG. 1 is an exemplary simplified semi-schematic block diagram of a personal shopping system in accordance with the present invention.

FIG. 1 illustrates a simplified, semi-schematic, block diagram of a compact, customer operated movable or mobile personal shopping terminal 5, operable in accordance with practice of principles of the present invention. The personal shopping mobile terminal 5 may be configured as a handheld apparatus, easily carried by a typical shopper, but is preferably mounted on or affixed to the handle portion of a shopping cart (not shown) of the type furnished shoppers for use in a typical retail facility. Alternatively, the personal shopping terminal 5 may be simply supported on a rack or platform, provided on the shopping cart, during use of the cart, following which the personal shopping terminal 5 may be removed and transported to a checkout facility. In its broader aspects, the invention only contemplates that the personal shopping terminal 5 be mobile and immediately accessible in a convenient fashion for viewing by a shopper and for operation of its controls, as will be described subsequently.

In the illustrated embodiment, the mobile personal shopping terminal 5 suitably comprises a display 10 suitable for displaying product data and other information in accordance with the invention as will be described further below. The display 10 may comprise any unit capable of displaying information, but preferably comprises a VGA or SVGA liquid-crystal-display (LCD) screen, and LED display screen, or any other suitable display apparatus. Pressure sensitive (touch screen) technology may be incorporated into the display 10 so that a shopper may access the mobile terminal 5 by merely touching certain portions of the screen. Alternatively, a numeric or alpha-numeric button or keypad arrangement may be provided in combination with the display 10 in order to define an input device.

Obtaining information relating to various purchased items is performed by a universal product code (UPC) bar code scanner 15, connected to input UPC bar codes to the mobile terminal 5. The display 10 and UPC bar code scanner 15 are, in turn, coupled to a microprocessor based control unit 20, operating under firmware or software program control, for performing any needed data processing functions and for controlling operation of the display 10.

Local storage apparatus 30 is further and optionally coupled to the control unit 20 and provides a local memory storage area for holding various data and tables (the context and structure of which will be described in greater detail below) until such time as the data is required for processing by the control unit 20. The local storage 30 may suitably comprise a small form factor hard disk drive, a PCMCIA programmable memory card, a high-capacity flexible media cartridge and floppy drive combination, an array of FROM (Flash ROM), SRAM or DRAM memory chips, or the like.

Communication between the mobile personal shopping terminal 5 and an external information source terminal is implemented by a wireless communication transceiver 32, preferably configured to transmit and receive RF signals between the control unit 20 and a similar transceiver hosted by a retail facility's central core server. The wireless communication transceiver 32 suitably comprises transmitter 35 and receiver 45 circuits coupled to an RF antenna 40. The wireless transceiver 32 is configured to transmit and receive digital data information at radio frequencies in the range of from about 900 MHz to about 2.4 GHz. Of the mentioned RF frequencies, broadcasts in the 900 MHz bands are the most common for applications of this type. Passive RF actuated location devices used by, for example, hospitals and other medical facilities, typically operate in the 902 MHz bands, while certain warehousing applications utilize RF transmissions in the 2.4 GHz bands. The foregoing may, thus, be seen as an exemplary frequency spectrum within which any of the bands may be used in accordance with the present invention without limitation. Due to the commercial prevalence of RF transceiver circuits operating in the 130 KHz bands, the wireless communication transceiver 32 may be adapted to advantageously operate in this portion of the RF spectrum.

As shown in the illustrated embodiment of FIG. 1, the mobile personal shopping terminal 5 communicates, via RF energy, with a retail store's core server 50 for purposes of accessing the retail facility's database 55 connected in conventional fashion thereto. Up-to-date pricing information, as well as the status of current store inventory are illustrative of the type of information comprising the retail facility database 55. For example, the facility manager may make a price change anytime to any of the products on the store shelves by accessing the core server 50 and inputting the appropriate changes to the database 55. In like manner, as a customer purchases a particular item, the quantity of that item may be decremented in the database so that a current running total inventory may be maintained. The wireless communication transceiver 32 provides the mobile terminal's control unit 20 with means for communicating with the retail facility core server 50 through an RF signal link. It will be immediately recognized by those having skill in the art, that a wireless transceiver need not be directly affixed to the core server 50. Rather, a plurality of RF transceivers may be located at periodic intervals throughout the retail facility and connected to the core server 50 through a local-area-network (LAN) array configuration, an arbitrated loop, or any other of a variety of conventional client-server topologies. Alternatively, communication between the core server 50 and a distributed array of RF transceivers may be accomplished, for example, by time division multiple access (TDMA), frequency division multiple access (FDMA), or any other suitable method which avoids interference while communicating with multiple transceiver units. In any of the foregoing configurations, it will be evident to one having skill in the art that the mobile personal shopping terminal 5 will always be capable of communicating with a retail facility's core server, regardless of the location of a shopper using the terminal and regardless of the size of the retail facility.

An additional I/O device is provided on the mobile personal shopping terminal 5 in the form of an IC card interface unit 60, configured to read information from and write information to an IC, or smart card. As will be developed in greater detail below, the IC card and card interface unit 60, in combination, provides a suitable means for a customer to transport pertinent data to and from a retail facility and exchange that pertinent data with the facility through use of the mobile personal shopping terminal 5 in accordance with practice of principles of the invention. While referred to as an IC card, the card is a personal memory card or data card which looks and feels much like an ordinary credit card. The IC card may be either contact based or contactless. The simplest contact-type card might be a magnetic tape storage stripe affixed in a particular location on its reverse side. Alternatively, a contact or contactless IC card may comprise a microprocessor, an electrically erasable field-programmable read-only memory (EEPROM), a Flash ROM (FROM) and, optionally, circuitry for inductively receiving an RF power signal. In its second configuration, the IC card is capable of capacitively transferring data signals between the card and the IC card interface unit 60 and may be interrogated, programmed or reprogrammed by read/write circuitry comprising the card interface 60.

Operation of a particular embodiment of the mobile personal shopping terminal (5 of FIG. 1) in accordance with practice of principles of the invention, will now be described with reference to FIGS. 6, 7 and 8. Specifically, shopping convenience is particularly enhanced by a customer location recognition feature of the personal shopping system which is able to recognize a customer's current location in a retail facility and, on the basis of a customer's current location, provide suitable directions or location indicia to promotional items which are located on store shelves most proximate to the customer's current location. Additionally, the customer location recognition feature is able to provide suitable directions or location indicia to selected items (such as the next item or the nearest item on a shopping list) on a particular customer's shopping list or to proposed replenishment items chosen on the basis of an analysis of shopper's personal shopping history, in a manner to be described further below. In addition to providing directions or location indicia to a shopper on the basis of predetermined or generated shopping lists, the customer location recognition feature is able to respond to customer prompts, by which a customer may further make inquiries about the location and direction of any specific item in the retail facility.

In the illustrated embodiment of FIG. 6, all merchandise information is maintained in a suitable format in a Price Look Up (PLU) Table which is, in turn, stored and maintained in the database (55 of FIG. 1) of a store's core server unit (50 of FIG. 1). Such a Price Look Up Table (PLU) is maintained in the central database in order that it may be easily accessed by the store manager to affect price changes, allocate coupon related discounts thereto, reflect merchandise location changes, and the like. While desirably maintained in the core server's database, the PLU Table may alternatively be maintained in the mass data storage unit (30 of FIG. 1) comprising a portion of the mobile personal shopping terminal. In the alternative case, the PLU Table, as hosted by the mobile terminal's local storage unit (30 of FIG. 1), is a mirror image of a virtual PLU Table hosted by the store's core server (50 of FIG. 1). Any desired changes to the contents of the PLU Table in local storage is transmitted to the mobile terminal's RF transceiver (32 of FIG. 1) by the store server, at which time the locally stored PLU Table is updated in accordance with the newly provided information. It should be noted that PLU Table updates need not be transmitted to the mobile terminal solely by RF communication. Updating local storage contents may be performed by any number of well known communication methods and might be effected by a LAN connection, an RS-232 connection, IR communication, and the like.

As illustrated in FIG. 6, a PLU Table suitably comprises a merchandise specific information set 300 and a merchandise location information set 310. The merchandise specific information set 300 may be arranged in a variety of ways, but is most advantageously configured as sequential entries, with each entry specific to a particular piece of merchandise. A merchandise entry includes the store's item identifier, such as a Stock Keeping Unit (SKU) number 302, which is identified to a particular product's, Universal Product Code (UPC) by a suitable conversion routine. An item entry further includes a text string, identified to each product, which gives the brand or trade name of the product and might include a generic description of the product as well as an identifying weights and measures metric, i.e., KLEENEX® Tissues, 500 pcs. In addition to the SKU number 302 and identifying text string 304, each item entry includes a price field 306 which might be further subdivided into a field which contains the item price, i.e. $1.99, and a field which contains comparison price-per-unit prices, i.e., 0.2¢ per piece. Thus, in accordance with the present invention, the merchandise specific information set 300 of the PLU Table, contains all of the necessary information upon which to base a purchasing decision with respect to a particular piece of merchandise, organized in accordance with their SKU codes.

In addition, a product location information entry 310 is associated with the merchandise specific information set 300, such that each item entry comprising the merchandise information set is associated with a specific location entry. For example, as depicted in FIG. 6, an item having an SKU of 00001, (Brand Name) Apples, is associated with a particular location, location-a, in the location information set 310. Similarly, an item having an SKU of 00002, (Brand Name) Tissues, is associated with a particular location, location-b, in the location information set 310. Although this is the simplest approach to matching location information to a specific piece of merchandise, it should be understood that the PLU table contains an entry for each and every item of merchandise stocked by the store. Thus, the PLU Table has an extremely large number of individual entries. In addition, many of these entries are for small items of merchandise which are often grouped together in one particular location. For example, there may be 300 different entries for various spices, but since spices come in small packages and are all normally located in the same general vicinity, they would necessarily have the same, or substantially similar, location information entry. Providing location information entries for each and every item of merchandise stocked by the store is wasteful of storage space.

Figure 7:
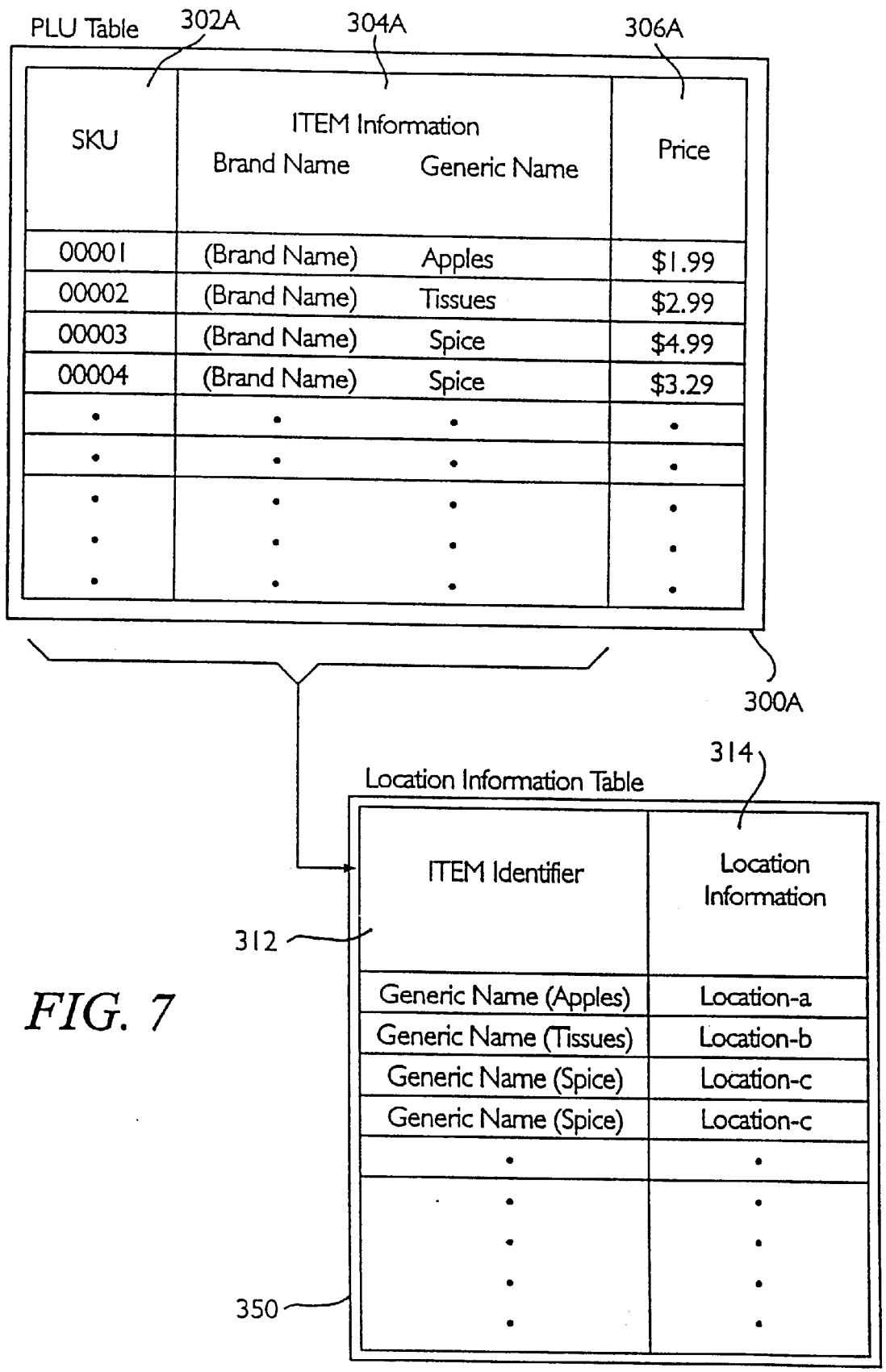
FIG. 7 is a conceptual layout diagram of an exemplary PLU table in accordance with a second embodiment of the invention.

FIG. 7 illustrates an alternative embodiment to the PLU Table illustrated in FIG. 6, in which a separate Location Information Table 350 is provided, without the location information being appended to a particular item entry. In the embodiment illustrated in FIG. 7, a merchandise specific information table 300A is seen to comprise substantially the same information as the merchandise specific information set 300 of FIG. 6, i.e., sequential item entries comprising an item's SKU number 302A, a text string identifying the brand, generic name and size/quantity metric 304A and a price field 306A. The separate product location information table 350 is characterized by a corresponding number of sequential item entries, with each item entry comprising an item identifier field 312 and an associated location information field 314. The item identifier field 312 may simply be a mirror image of the SKU field 302A of the corresponding product information table 300A, or a portion of each item's SKU code, but is preferably the product generic name from the PLU Table text string 304A. Thus, the separate product location information Table 350 may be significantly smaller (contain fewer item entries) than the PLU Table 300A. The PLU Table might have 300 separate entries for various spices, with each of the entries identified by the generic product name "spice". A specific product location would be associated with the generic term "spice" thus removing the need for 299 additional entries and, thereby shortening the size of the product location information table 350 as a result.

However identified, the item information field 312 provides a means of linking the location information field 314 of the location table 350 to any particular one of the items listed in the product table 300A in order that any item's location information may be accessed and displayed by a shopper's operation of the mobile personal shopping terminal (5 of FIG. 1).

Figure 8:
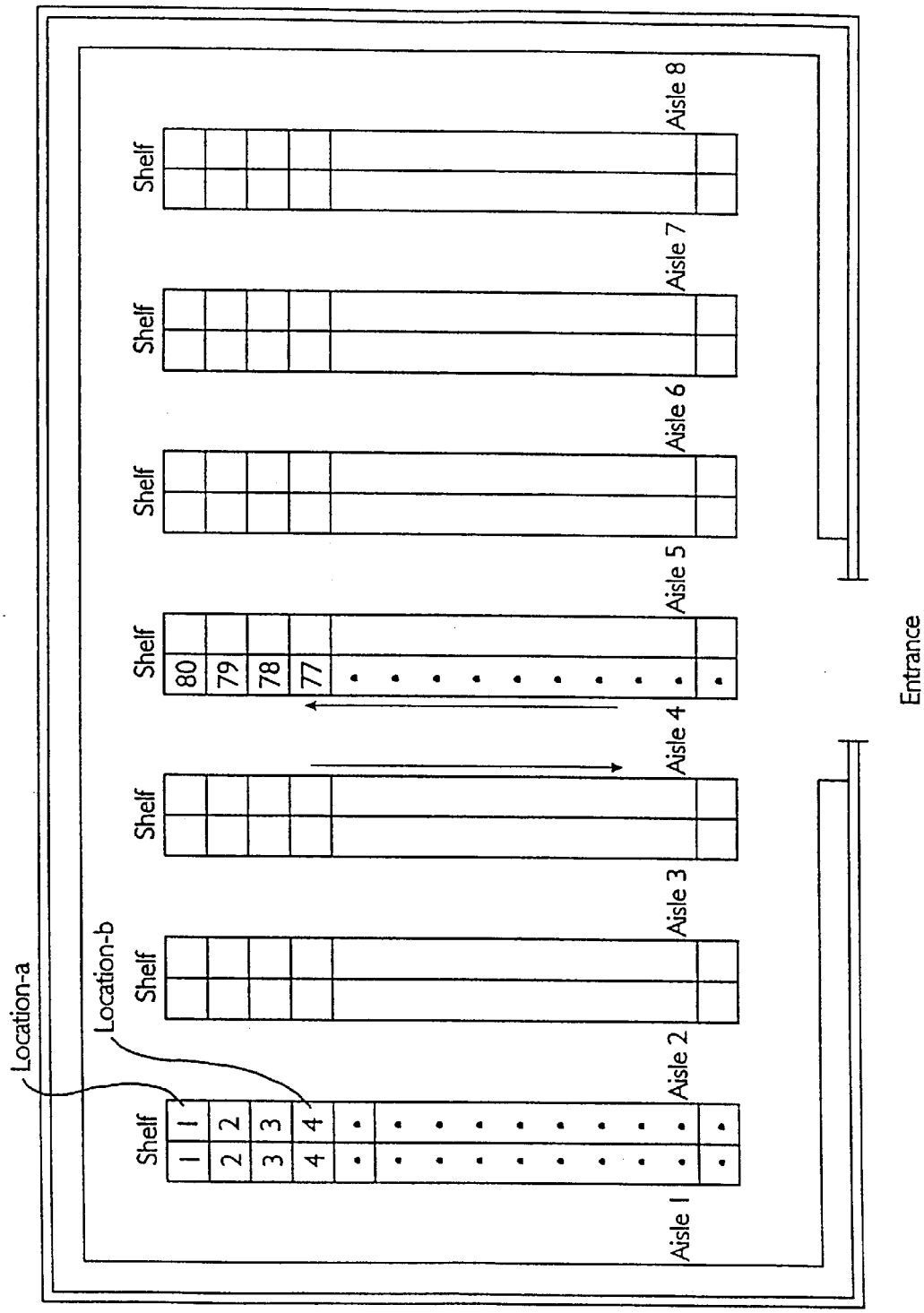
FIG. 8 is an exemplary layout diagram of a retail store depicting the relationship between item location information and the physical arrangement of store shelves.

Referring now to FIG. 8, location information, in the illustrated embodiment, may be suitably defined to comprise a particular item of merchandise's aisle and shelf numbers, as these are in turn laid out and defined by any particular retail facility. For example, the location information entry, location-a of FIG. 6 or FIG. 7, might actually appear as a text string that says shelf 1, aisle 2. This means that the merchandise associated with SKU number 00001, (Brand Name) Apples, can be found on shelf number 1, aisle 2 of the store. Likewise, the merchandise associated with SKU number 00002, (Brand Name) Tissues, might be located on shelf 4 of aisle 2. Its location information entry (location-b) would appear as a text string that says shelf 4, aisle 2.

Shelf and aisle numbers are preferably expressly referenced as location indicia in the location information set 310 of FIG. 6 or the separate product location information table 350 of FIG. 7. However identified, it is sufficient for purposes of the invention that each of the item entries in a PLU table have an associated location in the retail facility identified to them.

In one embodiment of the invention, when a customer desires to purchase an item, or to initialize the customer location recognition feature of the mobile terminal, the customer scans an item's UPC bar code, provided either on the product itself or in a convenient location on the display shelf proximate the item, using the UPC bar code scanner 15 provided on the mobile terminal. The item's UPC code is processed by the mobile terminal's control unit which may extract a particular item's SKU code from the UPC code and transmits the item's SKU number to the retail facility's core server (50 of FIG. 1) by means of its internal RF transceiver circuitry. Alternatively, rather than extracting an SKU code from the UPC bar code of a product, the mobile terminal's control unit may be configured to directly transmit all of the information comprising the UPC bar code to the retail facility's core server. Following transmission of the product information, the core server 50 invokes a search and retriever subroutine which enters the store database and searches the PLU Table comprising the database for the scanned item's SKU code.

Figure 9:
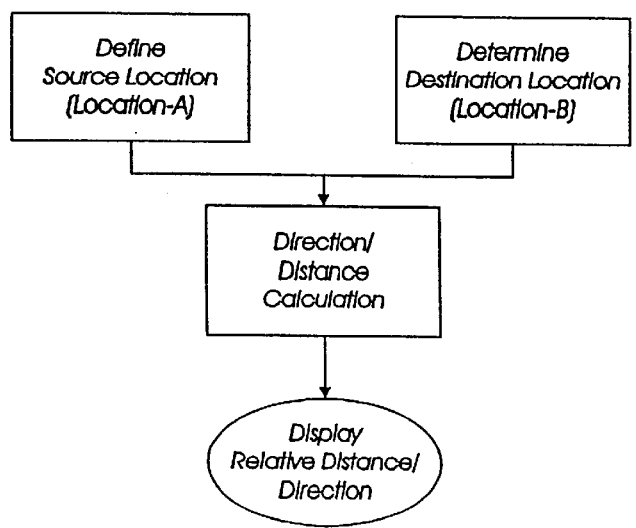
FIG. 9 an exemplary flow diagram of a customer location determination system in accordance with practice of the present invention.

Once a match is made between a scanned item's SKU code and an SKU field of an item entry, the core server 50 accesses the item entry and transmits the information contained therein to the mobile terminal. At the same time, the store's core server accesses the item's product location information from its associated product location information file entry and arbitrarily assigns that retrieved location to the particular customer's assumed current location. Once the present location of a customer is so defined, a customer is able to determine the location of a next item, for example on a shopping list, by transmitting any combination of information relating to that next item to the core server which, in turn, accesses the PLU table, and/or the location table and extracts the location information corresponding to the requested item. As illustrated in FIG. 9, the customer's source location (location-a) is processed with respect to a desired item's destination location (location-b) by either the mobile terminal or the core server which calculates direction and distance of the targeted desired item relative to the customer's current source location. Such computation is particularly advantageous when the mobile terminal or the core server has been preloaded with a retail facility topographic layout file which includes information regarding the distance between aisles, the number and size of shelves in each aisle, and the like. Following the relative direction and distance calculation, the customer might be instructed that "(Brand Name) Tissues are 3 meters to the left, of the current location, on the same aisle." Other coordinate terms, such as east, west, south, north; or towards the front, or towards the rear, may also be used by the system, as appropriate, as directional indicia. If a topographic store layout file is maintained by the mobile terminal or the core server, a map of the store may alternatively be displayed to the customer along with any required directional information to the targeted product. In this manner, the customer need not expend excess energy or time or become unduly frustrated in searching for items that need to be purchased.

A particular feature of the mobile personal shopping system in accordance with practice of principles of the invention is the ability to operate in accordance with an item-by-item shopping list prepared by the customer in advance of the customer's visit to the retail shopping facility. In particular, a customer may prepare a handwritten list of all of the items which they desire to purchase. The list is converted into a digital data format by raster scanning technology incorporated in a conventional optical scanner coupled to, for example, a personal computer system. Once the handwritten list is scanned into memory, the raster scanned graphical information is converted into text character codes by processing the information in accordance with any one of a number of conventional optical character recognition (OCR) algorithms hosted by an OCR program resident on the, for example, personal computer system. Scanning an optical character recognition conversion of a customer's handwritten shopping list may be implemented on a dedicated system, provided for such a purpose, in the retail facility or, alternatively, implemented on a customer's home personal computer system.

In one embodiment of the invention, if the scanning and conversion function is implemented in the retail facility, the converted character data comprising the shopper's shopping list, is transferred directly to the mobile personal shopping terminal (5 of FIG. 1) either by wireless transmission through the terminal's RF transceiver, through a wired I/O port such as an RS-232 port or by means of a high-density flexible media cartridge which may be inserted into an optional floppy drive unit comprising the terminal's mass data storage unit (30 of FIG. 1). In an alternative implementation, scanned and OCR converted text character data is transferred to the store's core server (50 of FIG. 1) which, in turn, transmits the data to the mobile terminal via the terminal's RF transceiver.

In a further embodiment to the present invention, a customer's shopping list may be directly input into an IC card via the alpha-numeric keypad of a customer's home personal computer system, and commanding the personal computer to write the shopping list into the appropriate variable storage range on the card. Once in the retail facility, the customer inserts the IC card into the IC card interface unit (60 of FIG. 1) which accesses the card and reads the shopping list into the terminal's local memory or mass data storage unit 30. Once in local memory or the storage unit 30 the customer's shopping list may be transmitted to the store's core server 50, utilizing the RF transceiver 32.

Pertinent to transferring a customer's shopping list to either the store's core server or to a customer's mobile terminal is that the electronic shopping system according to the invention includes means to identify each terminal to the core server so that each individual customer's transactions can be maintained separately. In particular, each terminal is assigned a unique terminal ID and all communications between that terminal and the store's core server are identified by that unique terminal ID. Alternatively, each customer is issued a unique customer ID which may be used by the mobile terminal as a unique identification flag such that transmissions between a mobile terminal and the store's core server can be allocated to a particular customer. If the mobile terminal communicates with a core server by using the terminal's ID the terminal will necessarily provide the customer's ID information to the core server so that transactions made by that terminal are allocated to that customer.

Figure 2:
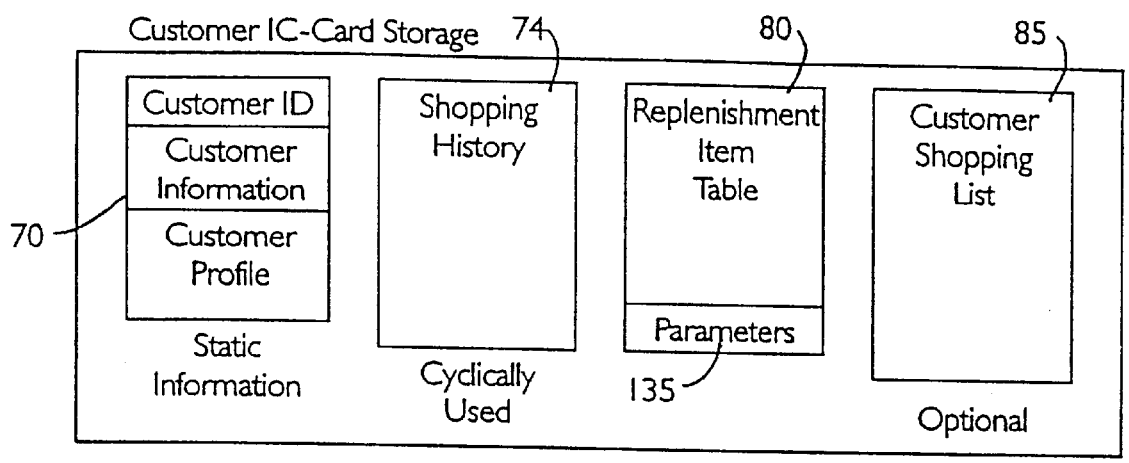
FIG. 2 is an exemplary semi-schematic block diagram of the information storage layout of a customer identification IC card for use with the personal shopping system of FIG. 1.

Having reference now to FIG. 2, there is depicted a conceptual diagram of the information storage layout of an exemplary IC card useful in practice of the present invention. A first, generally fixed, static information storage area 70 typically comprises a customer ID field which, as mentioned above, is used by the mobile terminal to uniquely identify itself to the store's core server in communications therewith. In addition to the customer ID field, the static information storage area 70 includes an allocated space which contains general information relating to the customer. Such general information would include the customer's name, home address, telephone number and date of birth. Also, space is allocated in the static information storage area 70 for a customer's demographic profile, which might include a customer's food preferences, drink preferences, hobbies and family structure (children, pets etc.) The static information storage area 70 is termed generally fixed since most of the information contained therein does not change with time. Needless to say, each of the allocated areas are able to be modified in the event that the customer's demographic or profile information should change, i.e., through marriage, an addition to the family, a move to a new address, and the like. The static information storage area 70 is termed generally fixed only in comparison with the generally variable character of the remaining allocated areas of the IC card as will be described further below.

A second, generally variable shopping history storage area 74 is also provided on the IC card, and comprises a recirculating information storage area containing a sequential list of the last items purchased at the store. Because of the need to efficiently allocate the limited amount of storage capacity of an IC card, the space allocated for the shopping history 74 is sequentially and cyclically written such that once the space is filled, the next entry overwrites the oldest shopping record entry. Thus, the shopping history 74 is being constantly updated with more recent transactions such that an up-to-date audit record of a customer's transaction history is accessible by merely interrogating the shopping history 74 of the IC card.

Figure 3:
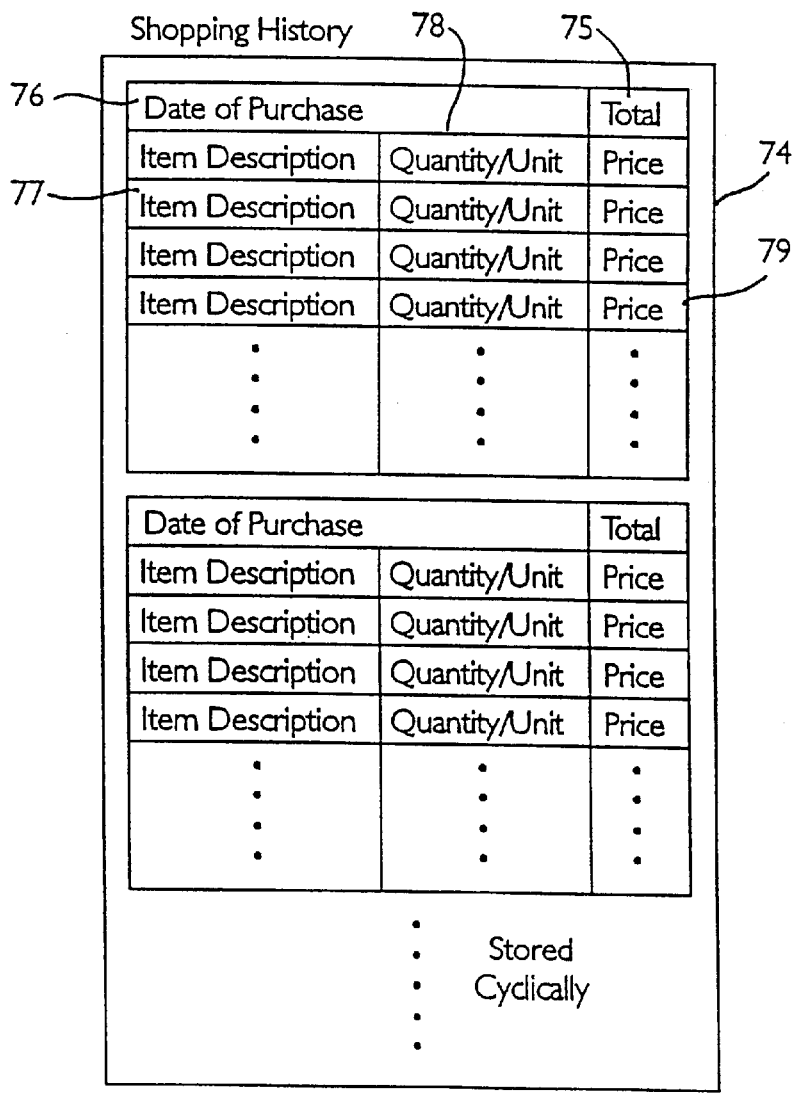
FIG. 3 is a conceptual layout diagram detailing the organization of a shopping history in accordance with practice of the present invention.

An illustrated embodiment of the format of a customer shopping history is depicted, in conceptual form, in FIG. 3. The exemplary shopping history 74 is best understood as comprising a sequence of lists, with each list being headed by a date of purchase entry 76 and a total purchase amount entry 75. For each date of purchase, the list suitably comprises an item description 77 which would advantageously include an item's SKU or UPC code, an item's trade or brand name, generic name and an item's weights and measures metric, in a manner similar to the PLU Tables of FIGS. 6 and 7.

Next to the item description field 77, a quantity field 78 lists the number of items or weight of the items identified in the item description field 77 along with an indication of unit-of-measure, i.e., pounds, pints, and the like. The price for each entry is listed in a price field 79. The item description, quantity and price string is repeated for each of the items purchased during the particular date of purchase. A previous day's purchase record is next provided in the shopping history 74 and identified to that day's date of purchase in like manner.

Returning now to FIG. 2, a further, generally variable replenishment item table 80 is provided on the IC card. The replenishment item table 80 is used for making recommendations to the customer as to items to replenish based on the customer's past shopping history and the calculated intervals between dates of purchase of various items, as will be described in greater detail below. The replenishment item table allows customers the luxury of minimizing their own investigations into the current state of items that might need replenishing and, indeed, minimizing the extent of a shopping list made prior to visiting the store. As will be amplified below, the replenishment item table provides a beneficial function even for customers who choose to take the time to prepare a shopping list prior to shopping. Replenishment recommendations, made by the system, will often alert these customers to any missing items that they may have forgotten to include while preparing their list, possibly saving them from making a second trip to the store.

A more detailed illustration of the conceptual layout of the replenishment item table (80 of FIG. 2) is illustrated in FIG. 4. In the illustrated embodiment, the replenishment item table 80 suitably comprises a multiplicity of horizontally disposed entries, each entry relating to a particular purchased item, and each entry subdivided into vertically disposed metrics, such that the entries and metrics define a table. Specifically, the metrics associated with each entry include an item description 100 comprising a particular item's SKU, PLU or UPC code, the item's trade or brand name, generic description and weights and measures metric. The item replenishment table 80 further includes a last purchase date entry 105 for each item and a last purchase quantity entry 110. From the last purchase date 105 and last purchase quantity 110 entries for each item, either the store's core server, the consumer's home personal computer system or preferably the mobile terminal, is used to calculate an average purchase interval entry 115 and an average purchase quantity entry 120 for each of the items comprising the replenishment table. The number of past purchases, defining the number of times the item was purchased is entered for each item in a number of past purchases entry 125.

Each of the item entries in the replenishment item table 80 includes a control flag field 130 which, depending on the logical state of a control flag (1 or 0), indicates whether to include or exclude a particular item from a purchase recommendation list, as will be described in further detail below. It should be noted, however, that the inherent limitation of storage capacity of an IC card will impose a constraint on the number of item entries that may be listed in the replenishment item table. Accordingly, the replenishment item table 80 of the IC card configuration of FIG. 2, includes a parameter space 135 for storing a system parameter corresponding to the number of items that might be listed in the corresponding table. The system parameter loaded into the parameter space 135 is easily definable by either the mobile terminal, a customer's home personal computer system or by a retail facility's core server, by simply evaluating the memory space allocated to the replenishment item table 80 against the maximum allowable size of any item entry. Dividing an item entry size into the size allocated for the replenishment item table necessarily gives the maximum number of entries that may be made to the table. This maximum number of entries is thus provided as a system parameter which may be accessed by either the mobile terminal, a retail facility's core server or a customer's home personal computer system.

At least two additional system parameters are defined and provided in the parameter storage area (135 of FIG. 2). A "minimum number of past purchases" parameter defines a threshold value against which the number of past purchases (125 of FIG. 4) entry for each item is compared. If the item is only infrequently purchased, i.e., purchased only once or twice in the course of a year, for example, and the minimum number of past purchases parameter is set to 5, the item is not included on a resulting purchase recommendation list. In addition, a "maximum purchase interval" defines a threshold time period which is compared against the last purchase date (105 of FIG. 4) entry for each item and which is used to determine whether or not to maintain a particular item entry on the replenishment item table. If, for example, the difference between the present date and the last purchase date (105 of FIG. 4) exceeds the maximum purchase interval parameter, the corresponding item entry is deleted from the replenishment item table.

The utility of the replenishment item table 80 in combination with the shopping history (75 of FIG. 2) will be best understood in the context of the following example. For purposes of the example, it will be assumed that the customer has made an earlier shopping trip and the shopping history thereof has been stored in the memory area of the IC card allocated to the shopping history 75. Prior to beginning the next shopping excursion, the prior shopping history data and the replenishment item table data are read from the IC card, either by the mobile personal shopping terminal (5 of FIG. 1) or a customer's home personal computer system. It will be evident that any necessary processing may be performed by either of the aforementioned apparatus, as well as by the core server of a retail facility to which the appropriate data has been provided by any of the communication means described above. For illustrative purposes only, and not for purposes of limitation, the example will be described in terms of all processing carried out by the mobile personal shopping terminal.

After the shopping history and replenishment item table data have been read from the IC card, each item in the shopping history file is compared against items in the replenishment item table. If corresponding entries are found, the last purchase date and last purchase quantity entries for that item are updated in the replenishment item table and a new average purchase interval and average purchase quantity are calculated with respect to the number of past purchases and the difference between the purchase date taken from the shopping history and the residual last purchase date in the replenishment item table. The number of past purchases is incremented.

In contrast, if there is no corresponding item entry in the replenishment item table to an item entry of the shopping history, the remaining item entries of the shopping history are searched to determine if there are additional entries for this item. If more than one entry for a particular item is found in the shopping history, but not in the replenishment item table, a new item entry (a new record) is added to the replenishment item table for that item. Single quantity, non-repetitive items are ignored.

This process iterates through all of the items listed in the shopping history. The maximum purchase interval parameter is evaluated and any items whose last purchase date exceeds the threshold are deleted from the replenishment item table.

Following processing, the items remaining in the replenishment item table, which are coded with the appropriate control flag, will be displayed by the mobile personal shopping terminal as replenishment items recommended for purchase by the consumer.

A particular feature of the present invention is that replenishment table entry items may be displayed even if they have not exceeded the minimum number of past purchases by allowing the customer to request recommendation of a particular item. In addition, the replenishment item list can be configured to display items that have not reached or exceeded the average purchase interval but are reasonably close thereto. For example, items might be displayed which are at 75% to 80% of the interval, allowing the customer to decide whether or not to include that item in the final replenishment item list.

Figure 5A:
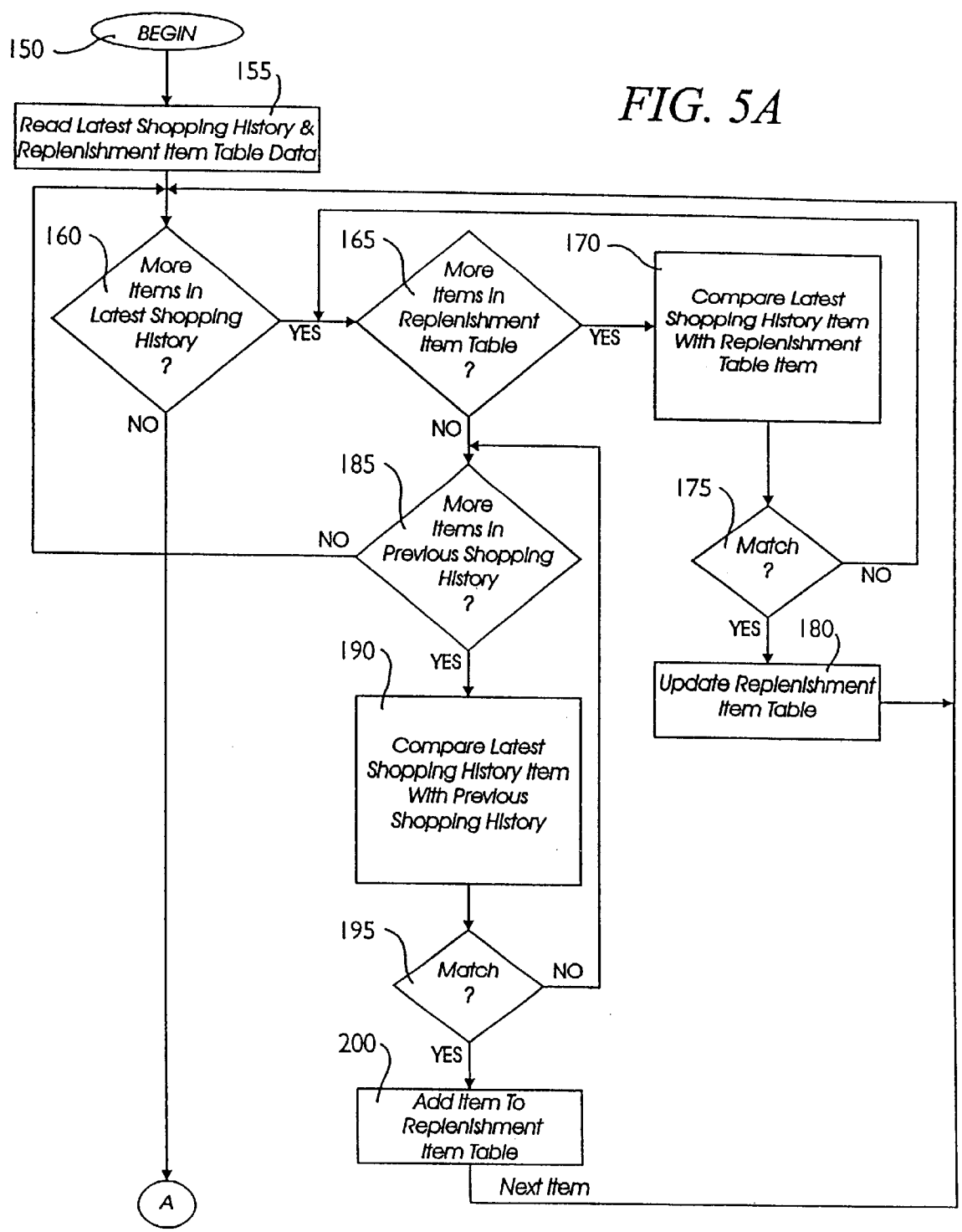
FIGS. 5A and 5B are exemplary flow diagrams for updating a replenishment item table and for making recommendations on items that require replenishment.
Figure 5B:
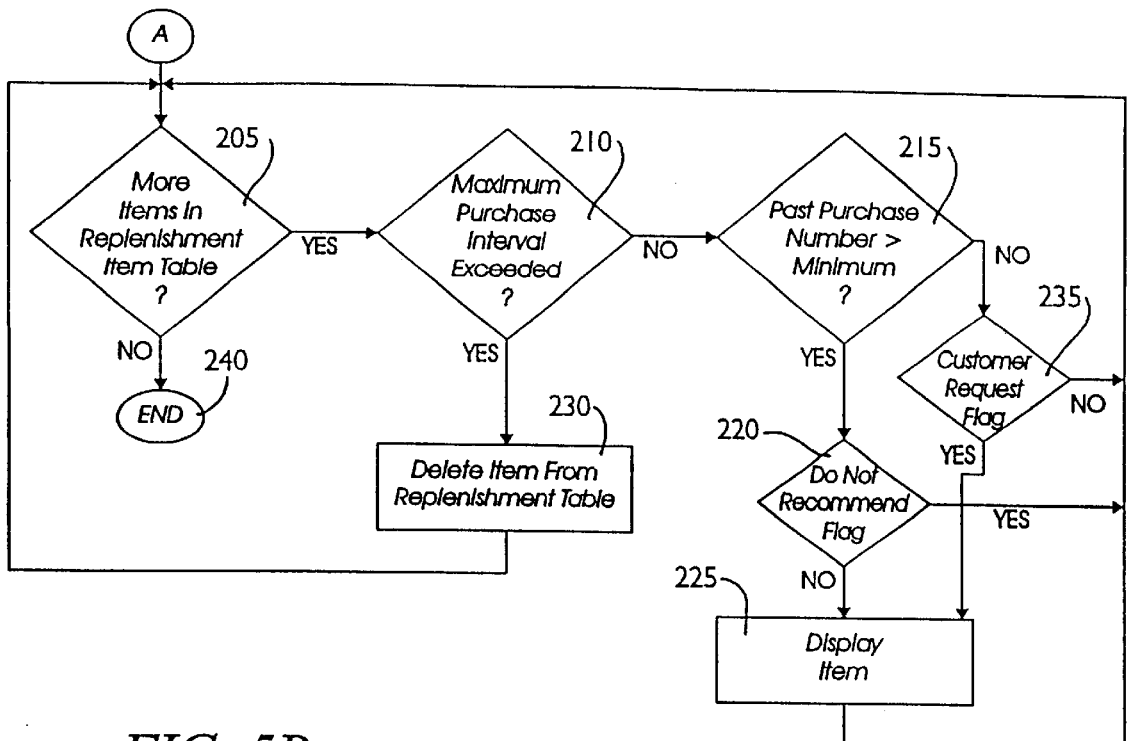

FIGS. 5A–5B are exemplary flow diagrams illustrating the steps undertaken by either a customer's home personal computer system or the control unit of the mobile personal shopping terminal, for processing the shopping history and replenishment item table data, updating the replenishment item table on the basis of the process data, and constructing a recommended replenishment item shopping list therefrom.

The process initiates at start bubble 150. Process initiation may be when a customer's IC card is inserted into an IC card interface comprising either a home personal computer system or the mobile personal shopping terminal (5 of FIG. 1) and the process application invoked. The latest shopping history data resident on the IC card along with the resident replenishment item table are read from the IC card at 155. Once the latest shopping history data and replenishment item table are read, the process enters a multiplicity of nested decision loops in order to determine whether or not to update the replenishment item table with an item contained in the latest shopping history data. The first loop begins at decision diamond 160 and determines whether or not there is a next sequential unread item in the latest shopping history data. If the answer is YES, the routine enters a second decision loop and an inquiry is made at decision diamond 165 whether or not there are any unread items remaining in the replenishment item table. If the decision parameter in decision diamond 165 is YES, the next unread item in the latest shopping history is compared to the next unread item in the replenishment item table 170. In the event of a match (decision diamond 175), the replenishment item table is updated at 180 and the routine returns to the outside loop and queries whether there are any additional unread items remaining in the latest shopping history at decision diamond 160.

As was mentioned previously, when the replenishment item table is updated, the average purchase interval and average purchase quantity for a particular item are recalculated based on the number of past purchases and the difference between the last noted shopping date corresponding to that item in the shopping history and the last noted purchase date for that item in the prior replenishment item table.

Returning now to FIG. 5A, and decision diamond 175, if no match is found between the shopping history item and a replenishment item table item, the routine loops back to decision diamond 165 and accesses any next remaining unread items in the replenishment item table. The process continues to loop until either a match is found or there are no remaining unread items in the replenishment item table to compare (decision diamond 165). A next, interior decision loop is then invoked in order to determine whether or not an item in the latest shopping history that has no current match in the replenishment item table warrants being added thereto as a replenishment item. If there are no more items in the replenishment item table to compare the shopping history item to (decision diamond 165), a search is conducted in previous shopping history records (decision diamond 185) to see if the present item has a historical record of purchase. If a comparison of the item in the latest shopping history record matches an entry in a previous shopping history record 190, 195, the item is added to the replenishment table 200 as a replenishment item. If no matches are found for the present item in previous shopping history records (decision diamond 185) control is past back to the outside loop, at decision diamond 160, in order to determine whether there are any next remaining unread items in the latest shopping history data. The exterior and interior program loops continue until there are no remaining unread items in the latest shopping history, at which point the replenishment item table is deemed updated, at A, and program control is past to a next subroutine which determines the specific items comprising the updated replenishment item table to display to the customer as a recommended replenishment item purchase.

Turning now to FIG. 5B, after the replenishment item table has been deemed updated, at A, the subroutine begins by initializing and sequentially analyzing each of the items in the updated replenishment item table. At decision diamond 205, an inquiry is made as to whether or not there are any remaining items in the replenishment item table left to examine. If so, the next item is accessed and a further inquiry is made as to whether or not the maximum purchase interval has been exceeded (decision diamond 210). If the inquiry returns a YES parameter, this indicates that the item is not one which the customer purchases regularly and, therefore, the item is deleted from the replenishment item table 230 and the routine again queries whether there are any remaining items in the replenishment item table left to analyze (decision diamond 205).

On the other hand, if the purchase interval decision diamond returns a NO parameter, indicating that the purchase interval has not been exceed for that item, a further inquiry is made as to whether or not the number of past purchases exceeds the minimum number of past purchases (customer defined system parameter) at decision diamond 215. At a NO response to the query, the routine gives the customer the option of requesting a particular item whether or not the number of past purchases exceeds the minimum number of past purchases. The routine examines the control flag field to determine if the customer has requested an item at decision diamond 235. A NO response to this query returns the routine to decision diamond 205 and the analysis is repeated on a next unread item. A YES response to the customer request query will cause display of that particular item on the customer's display unit as a recommended replenishment item 225. If the "past purchase" decision diamond 215 passes a YES parameter, the routine examines the control flag field to determine if the customer has manually input a "do not recommend" flag at decision diamond 220. In particular, the control flag for recommendation is defaulted to a set condition, while a customer's "do not recommend" action has the effect of clearing the recommendation control flag. Accordingly, a YES response to the query of decision diamond 220 will cause display of that particular item on the customer's display unit as a recommended replenishment item 225, while a NO response returns the routine to decision diamond 205. The routine ends when there are no remaining items in the replenishment item table to examine 240.

It should be noted that decisions made with regard to the maximum purchase interval and the number of past purchases are done by passing the system parameters (131 and 132 of FIG. 4) to the algorithm in order to give the algorithm a threshold for making comparison decisions. However, as was described above, the replenishment item list can be configured to display items that have not reached or exceeded the average purchase interval and to display items whose number of past purchases have not exceeded the minimum number required by the system parameter. For example, the algorithm may be easily configured to include an additional, user configurable parameter, which might instruct the algorithm to display items that have not reached or exceeded the, for example, average purchase interval, but are reasonably close thereto. In particular, the system parameter might instruct the algorithm to display all items, items which are at 75–80% of the interval, or items whose purchase interval is within a certain number of days from the maximum purchase interval. This feature would cause additional items to be displayed and allow the customer the option of deciding whether or not to include a particular item in the final replenishment item list.

In addition to making recommendations on replenishment items, the system according to the invention is also configured to display recommendations regarding promotional items. Such recommendations are based on information contained in the customer's profile (70 of FIG. 2) which is obtained from the customer's IC card. For example, once the mobile personal shopping terminal makes initial contact with the retail facility's core server and transmits the customer ID and profile information thereto, if the profile indicates that the customer is a married woman with a newborn child, the core server will provide the mobile terminal with data regarding all the newborn-related goods on sale. Alternatively, a promotional item listed is downloaded from the server by the mobile terminal and the mobile terminal's processor performs the function of selecting various promotional items for display based on a customer's particular profile information. The system displays the promotional items in the same manner as the recommended replenishment list and is further able to provide the customer with the location and direction of the closest such item to the customer's current location, in the same manner as that described above in connection with a next item on the customer's shopping list. Thus, even if a customer fails to notice a sign or an advertisement about a sale product that the customer would be interested in purchasing, the recommendation of such products on the customer's display unit ensures that the customer will not miss out on the savings offered by the store.

An additional feature provided by the mobile terminal in accordance with practice of the invention is that the mobile terminal is able to keep track of which items on a customer provided shopping list were actually purchased, by comparing items scanned by the customer to items on the shopping list. By running a simple application program, the mobile terminal is able to determine which items on the shopping list were not purchased at that store. The mobile terminal can transmit a list of unpurchased items to the store server at the end of a particular shopping trip. This list of unpurchased items can then be accessed by the store's management personnel and analyzed in order to determine the store's "opportunity loss". Opportunity loss is a serious problem for retail stores since it suggests that another store is successfully competing for business in certain areas. If the store's management personnel are able to determine what types of items are routinely purchased elsewhere, they will be able to take remedial steps to regain that business. Thus, the mobile terminal's data acquisition and transfer features would prove highly beneficial to a retail facility, as well as to a consumer.

It will be understood that the foregoing is merely illustrative of practice of principles of the invention and that various modifications can be made by those skilled in the art without departing from the spirit and scope of the invention as defined by the following claims. For example, the personal shopping system may, when a customer scans an item, also transmit customer information to a point-of-sale (POS) terminal or to a mobile terminal utilized by store clerks. Such information may include the customer's name and other pertinent demographic data, whether the customer is a frequent shopper, premier customer or a newly enrolled customer, as well as information regarding the customer's current location. With such information in their possession, store clerks are able to greet customers by name and significantly enhance personalization of the services rendered by the store.

What is claimed is:

1. A mobile, electronic shopping terminal comprising:
   a code reader that is operative to read an item identification code;
   a display that is operative to display information;
   a storage device that is operative to store an item database that includes item identification codes and associated item location information for the respective codes; and
   a control unit connected to the code reader, display, and storage unit, wherein the control unit is programmed to receive an item identification code from the code reader, retrieve corresponding item location information from the storage unit to determine a current location of the terminal, the control unit being further programmed to determine a destination item based on the current location of the terminal, and to transfer information relating to the destination item to the display.

2. The terminal of claim 1, wherein the code reader comprises a bar code scanner.

3. The terminal of claim 1, wherein the control unit is programmed to calculate at least one of distance and direction information relating to the destination item.

4. The terminal of claim 1, wherein the storage device is designed to store user-specific data relating to items to be purchased by the user, and wherein the control unit selects the item that is physically closest to the current location as the destination item.

5. The terminal of claim 1, wherein the storage device is designed to store user-specific data relating to items to be purchased by the user, and wherein the control unit is programmed to select a next item as the destination item.

6. The terminal of claim 1, wherein the storage device further stores a customer-defined shopping list, wherein the destination item is the sequentially next item in the shopping list.

7. The terminal of claim 1, wherein the terminal comprises a transmitter and a receiver for communication with a remote store computer.

8. The terminal of claim 7, wherein the store computer is programmed to maintain a customer-defined shopping list and calculate a direction and distance to the destination item from the customer's current location, the store computer further automatically processing the shopping list items to define a closest item to the customer's current location as the destination item, the store computer being programmed to transmit corresponding information to the terminal, and wherein the processor is programmed to forward the information to the display.

9. The terminal of claim 1, wherein the storage device includes a replenishment item recommendation list, and wherein the processor is programmed to retrieve information corresponding to items from the list based on the current location of the terminal and to display the information on the display.

10. The terminal of claim 7, wherein the store computer maintains a customer profile for each customer and processes the information in a customer profile to determine recommended promotional items for presentation to the customer, the store computer calculating a direction and distance to a destination item relative to the customer's current location, the store computer further automatically processing the recommended promotional items to define a closest promotional item to the customer's current location as the destination item.

11. The terminal of claim 1 further comprising a memory for storing a customer-defined shopping list, wherein the destination item is an item in the shopping list closest to the customer's current location.

12. A method for providing information to a customer in a store, comprising;
receiving item identification information relating to a first item;
processing the item identification information to determine a current location of the customer; and
presenting information relating to a second item to the customer based on the determined location of the customer.

13. The method of claim 12, wherein receiving the item identification information comprises scanning a bar code on the first item.

14. The method of claim 12, wherein presenting information comprises presenting directions to the second item.

15. The method of claim 12, wherein processing the item identification information comprises comparing the item identification information with plural entries in a look-up table and retrieving corresponding location information upon finding a match for the item identification information.

16. The method of claim 12, further comprising maintaining an item database at a store computer and wherein processing is carried out by the store computer.

17. The method of claim 12, further comprising:
providing a customer-defined shopping list; and
defining a next item on the shopping list as the second item.

18. The method of claim 12, further comprising:
providing a customer defined shopping list, the shopping list including at least an item indicia for each item, the item indicia corresponding to the identification indicia of a merchandise item;
processing the shopping list items to define a closest item to the customer's current location; and
defining the closest item on the shopping list as the second item.

19. The method of claim 12, further comprising:
providing a replenishment item recommendation list, the recommendation list including at least an item indicia for each item, the item indicia recognizable is corresponding to the identification indicia for a merchandise item; and
defining a next item on the recommendation list as the second item.

20. The method of claim 14, further including displaying a store map graphic on the display unit in conjunction with the directions to the second item.

* * * * *

UNITED STATES PATENT AND TRADEMARK OFFICE
CERTIFICATE OF CORRECTION

PATENT NO. : 6,386,450 B1
DATED : May 14, 2002
INVENTOR(S) : Nobuo Ogasawara

It is certified that error appears in the above-identified patent and that said Letters Patent is hereby corrected as shown below:

<u>Column 18,</u>
Line 45, replace "recognizable is" with -- recognizable as --

Signed and Sealed this

Seventeenth Day of June, 2003

JAMES E. ROGAN
*Director of the United States Patent and Trademark Office*